US010417037B2

(12) United States Patent
Gruber et al.

(10) Patent No.: US 10,417,037 B2
(45) Date of Patent: Sep. 17, 2019

(54) SYSTEMS AND METHODS FOR INTEGRATING THIRD PARTY SERVICES WITH A DIGITAL ASSISTANT

(71) Applicant: Apple Inc., Cupertino, CA (US)

(72) Inventors: Thomas R. Gruber, Emerald Hills, CA (US); Christopher D. Brigham, San Jose, CA (US); Adam J. Cheyer, Oakland, CA (US); Daniel Keen, San Jose, CA (US); Kenneth Kocienda, San Jose, CA (US)

(73) Assignee: Apple Inc., Cupertino, CO (US)

(*) Notice: Subject to any disclaimer, the term of this patent is extended or adjusted under 35 U.S.C. 154(b) by 258 days.

(21) Appl. No.: 13/894,350

(22) Filed: May 14, 2013

(65) Prior Publication Data

US 2013/0311997 A1 Nov. 21, 2013

Related U.S. Application Data

(60) Provisional application No. 61/799,916, filed on Mar. 15, 2013, provisional application No. 61/647,434, filed on May 15, 2012.

(51) Int. Cl.
*G06F 9/46* (2006.01)
*H04W 4/00* (2018.01)
(Continued)

(52) U.S. Cl.
CPC .............. *G06F 9/46* (2013.01); *G06F 9/4843* (2013.01); *G06F 9/4856* (2013.01); *G06Q 10/10* (2013.01); *H04W 4/00* (2013.01); *H04W 4/029* (2018.02)

(58) Field of Classification Search
None
See application file for complete search history.

(56) References Cited

U.S. PATENT DOCUMENTS 3,704,345 A 11/1972 Coker et al.
3,828,132 A 8/1974 Flanagan et al.
(Continued)

FOREIGN PATENT DOCUMENTS

CH 681573 A5 4/1993
CN 1757027 A 4/2006
(Continued)

OTHER PUBLICATIONS

Alfred App, 2011, http://www.alfredapp.com/, 5 pages.
(Continued)

*Primary Examiner* — Lewis A Bullock, Jr.
*Assistant Examiner* — Bruce S Ashley
(74) *Attorney, Agent, or Firm* — Dentons US LLP

(57) ABSTRACT

The electronic device with one or more processors and memory receives an input of a user. The electronic device, in accordance with the input, identifies a respective task type from a plurality of predefined task types associated with a plurality of third party service providers. The respective task type is associated with at least one third party service provider for which the user is authorized and at least one third party service provider for which the user is not authorized. In response to identifying the respective task type, the electronic device sends a request to perform at least a portion of a task to a third party service provider of the plurality of third party service providers that is associated with the respective task type.

52 Claims, 7 Drawing Sheets

(51) Int. Cl.
*H04W 4/02* (2018.01)
*G06Q 10/10* (2012.01)
*G06F 9/48* (2006.01)
*H04W 4/029* (2018.01)

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |

(56) References Cited

U.S. PATENT DOCUMENTS

| | | |
|---|---|---|
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,094,649 A | 6/2000 | Bowen et al. |
| 6,088,731 A | 7/2000 | Kiraly et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Belllegarda et al. |
| 6,401,085 B1 * | 6/2002 | Gershman ......... G06F 17/30867 |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |

(56) References Cited

U.S. PATENT DOCUMENTS

| | | | |
|---|---|---|---|
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,013,308 B1* | 3/2006 | Tunstall-Pedoe ............ 707/709 |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,619 B1 | 5/2009 | Seligman et al. |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,584,278 B2* | 9/2009 | Rajarajan et al. ............ 709/226 |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |

(56) References Cited

U.S. PATENT DOCUMENTS

| | | | |
|---|---|---|---|
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,945,470 B1 * | 5/2011 | Cohen et al. | 705/7.13 |
| 7,949,529 B2 | 5/2011 | Weider et al. | |
| 7,949,534 B2 | 5/2011 | Davis et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |
| 7,987,151 B2 | 7/2011 | Schott et al. | |
| 7,996,228 B2 | 8/2011 | Miller et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,131,557 B2 | 3/2012 | Davis et al. | |
| 8,140,335 B2 | 3/2012 | Kennewick et al. | |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,190,596 B2 * | 5/2012 | Nambiar | G06F 17/30557 707/714 |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,374,871 B2 | 2/2013 | Ehsani et al. | |
| 8,447,612 B2 | 5/2013 | Gazdzinski | |
| 2001/0047264 A1 | 11/2001 | Roundtree | |
| 2002/0032564 A1 | 3/2002 | Ehsani et al. | |
| 2002/0046025 A1 | 4/2002 | Hain | |
| 2002/0069063 A1 | 6/2002 | Buchner et al. | |
| 2002/0077817 A1 | 6/2002 | Atal | |
| 2002/0103641 A1 | 8/2002 | Kuo et al. | |
| 2002/0164000 A1 | 11/2002 | Cohen et al. | |
| 2002/0198714 A1 | 12/2002 | Zhou | |
| 2003/0187775 A1 * | 10/2003 | Du | G06F 9/441 705/37 |
| 2004/0135701 A1 | 7/2004 | Yasuda et al. | |
| 2004/0236778 A1 | 11/2004 | Junqua et al. | |
| 2005/0055403 A1 | 3/2005 | Brittan | |
| 2005/0071332 A1 | 3/2005 | Ortega et al. | |
| 2005/0080625 A1 | 4/2005 | Bennett et al. | |
| 2005/0091118 A1 | 4/2005 | Fano | |
| 2005/0102614 A1 | 5/2005 | Brockett et al. | |
| 2005/0108001 A1 | 5/2005 | Aarskog | |
| 2005/0114124 A1 | 5/2005 | Liu et al. | |
| 2005/0119897 A1 | 6/2005 | Bennett et al. | |
| 2005/0143972 A1 | 6/2005 | Gopalakrishnan et al. | |
| 2005/0165607 A1 | 7/2005 | DiFabbrizio et al. | |
| 2005/0182629 A1 | 8/2005 | Coorman et al. | |
| 2005/0196733 A1 | 9/2005 | Budra et al. | |
| 2005/0246726 A1 * | 11/2005 | Labrou et al. | 719/328 |
| 2005/0288936 A1 | 12/2005 | Busayapongchai et al. | |
| 2006/0018492 A1 | 1/2006 | Chiu et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0143007 A1 | 6/2006 | Koh et al. | |
| 2006/0165105 A1 * | 7/2006 | Shenfield et al. | 370/401 |
| 2007/0032247 A1 | 2/2007 | Shaffer et al. | |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0135949 A1 | 6/2007 | Snover et al. | |
| 2007/0174188 A1 | 7/2007 | Fish | |
| 2007/0185917 A1 | 8/2007 | Prahlad et al. | |
| 2007/0240172 A1 * | 10/2007 | Banker | G06F 9/465 719/328 |
| 2007/0282595 A1 | 12/2007 | Tunning et al. | |
| 2008/0015864 A1 | 1/2008 | Ross et al. | |
| 2008/0021708 A1 | 1/2008 | Bennett et al. | |
| 2008/0034032 A1 | 2/2008 | Healey et al. | |
| 2008/0052063 A1 | 2/2008 | Bennett et al. | |
| 2008/0120112 A1 | 5/2008 | Jordan et al. | |
| 2008/0129520 A1 | 6/2008 | Lee | |
| 2008/0140657 A1 | 6/2008 | Azvine et al. | |
| 2008/0221903 A1 | 9/2008 | Kanevsky et al. | |
| 2008/0228496 A1 | 9/2008 | Yu et al. | |
| 2008/0247519 A1 | 10/2008 | Abella et al. | |
| 2008/0249770 A1 | 10/2008 | Kim et al. | |
| 2008/0300878 A1 | 12/2008 | Bennett | |
| 2008/0319763 A1 | 12/2008 | Di Fabbrizio et al. | |
| 2009/0006100 A1 | 1/2009 | Bather et al. | |
| 2009/0006343 A1 | 1/2009 | Platt et al. | |
| 2009/0030800 A1 | 1/2009 | Grois | |
| 2009/0055179 A1 | 2/2009 | Cho et al. | |
| 2009/0058823 A1 | 3/2009 | Kocienda | |
| 2009/0076796 A1 | 3/2009 | Daraselia | |
| 2009/0077165 A1 | 3/2009 | Rhodes et al. | |
| 2009/0100049 A1 | 4/2009 | Cao | |
| 2009/0112677 A1 | 4/2009 | Rhett | |
| 2009/0138430 A1 | 5/2009 | Nambiar et al. | |
| 2009/0150156 A1 | 6/2009 | Kennewick et al. | |
| 2009/0157401 A1 | 6/2009 | Bennett | |
| 2009/0164441 A1 | 6/2009 | Cheyer | |
| 2009/0171664 A1 | 7/2009 | Kennewick et al. | |
| 2009/0287583 A1 | 11/2009 | Holmes | |
| 2009/0290718 A1 | 11/2009 | Kahn et al. | |
| 2009/0299745 A1 | 12/2009 | Kennewick et al. | |
| 2009/0299849 A1 | 12/2009 | Cao et al. | |
| 2009/0307162 A1 | 12/2009 | Bui et al. | |
| 2010/0005081 A1 | 1/2010 | Bennett | |
| 2010/0023320 A1 | 1/2010 | Di Cristo et al. | |
| 2010/0036660 A1 | 2/2010 | Bennett | |
| 2010/0042400 A1 | 2/2010 | Block et al. | |
| 2010/0066546 A1 | 3/2010 | Aaron | |
| 2010/0088020 A1 | 4/2010 | Sano et al. | |
| 2010/0138215 A1 | 6/2010 | Williams | |
| 2010/0145700 A1 | 6/2010 | Kennewick et al. | |
| 2010/0204986 A1 | 8/2010 | Kennewick et al. | |
| 2010/0217604 A1 | 8/2010 | Baldwin et al. | |
| 2010/0228540 A1 | 9/2010 | Bennett | |
| 2010/0235341 A1 | 9/2010 | Bennett | |

(56) References Cited

U.S. PATENT DOCUMENTS

| | | |
|---|---|---|
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0302056 A1 | 12/2010 | Dutton et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0087685 A1 | 4/2011 | Lin et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0276598 A1 | 11/2011 | Kozempel |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0014026 A1* | 1/2013 | Beringer .......... G06Q 10/06311 715/753 |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| CN | 101499156 A | 8/2009 |
| DE | 3837590 A1 | 5/1990 |
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 8-339288 A | 12/1996 |
| JP | 2001 125896 | 5/2001 |
| JP | 2002 024212 | 1/2002 |
| JP | 2003 517158 A | 5/2003 |
| JP | 2005-275925 A | 10/2005 |
| JP | 2009 036999 | 2/2009 |
| KR | 10-2001-0092415 A | 10/2001 |
| KR | 10-2006-0061190 A | 6/2006 |
| KR | 10-2007-0057496 | 6/2007 |
| KR | 10-2007-0061116 A | 6/2007 |
| KR | 10-2007-0094767 A | 9/2007 |
| KR | 10-0776800 B1 | 11/2007 |
| KR | 10-2008-001227 | 2/2008 |
| KR | 10-0810500 B1 | 3/2008 |
| KR | 10-2008-0059332 A | 6/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10-2010-0048571 A | 5/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 2000/60435 | 10/2000 |
| WO | WO 2000/60435 A3 | 10/2000 |
| WO | WO 02/073603 A1 | 9/2002 |
| WO | WO 2006/129967 A1 | 12/2006 |
| WO | WO-2007/051131 A1 | 5/2007 |
| WO | WO 2008/085742 A2 | 7/2008 |
| WO | WO 2008/109835 A2 | 9/2008 |
| WO | WO 2011/088053 A2 | 7/2011 |
| WO | 2013/173504 A1 | 11/2013 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Bussler, C., et al., "Web Service Execution Environment (WSMX)," Jun. 3, 2005, W3C Member Submission, http://www.w3.org/Submission/WSMX, 29 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

(56) References Cited

OTHER PUBLICATIONS

Chen, Y., "Multimedia Siri Finds and Plays Whatever You Ask for," Feb. 9, 2012, http://www.psfk.com/2012/02/multimedia-siri.html, 9 pages.

Cheyer, A., "About Adam Cheyer," Sep. 17, 2012,http://www.adam.cheyer.com/about.html, 2 pages.

Cheyer, A., "A Perspective on AI & Agent Technologies for SCM," VerticalNet, 2001 presentation, 22 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Elio, R. et al., "On Abstract Task Models and Conversation Policies," May 1999, http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://vvww.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

(56) References Cited

OTHER PUBLICATIONS

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/p.-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

McGuire, J., et al., "SHADE: Technology for Knowledge-Based Collaborative Engineering," 1993, Journal of Concurrent Engineering: Applications and Research (CERA), 18 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

*Phoenix Solutions, Inc. v. West Interactive Corp.*, Document 40, Declaration of Christopher Schmandt Regarding the MIT Galaxy System dated Jul. 2, 2010, 162 pages.

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.

Rivlin, Z., et al., "Maestro: Conductor of Multimedia Analysis Technologies," 1999 SRI International, Communications of the Association for Computing Machinery (CACM), 7 pages.

Roddy, D., et al., "Communication and Collaboration in a Landscape of B2B eMarketplaces," VerticalNet Solutions, white paper, Jun. 15, 2000, 23 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http://www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakTolt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Vlingo, "Vlingo Launches Voice Enablement Application on Apple App Store," Vlingo press release dated Dec. 3, 2008, 2 pages.

Zue, V., "Conversational Interfaces: Advances and Challenges," Sep. 1997, http://www.cs.cmu.edu/~dod/papers/zue97.pdf, 10 pages.

(56) References Cited

OTHER PUBLICATIONS

Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/ 20861, which corresponds to U.S. Appl. No. 12/987,982, 15 pages (Thomas Robert Gruber).
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I. et al., "Error-Correction Detection and Response Generation in a Spoken Dialogue System," © 2004 Elsevier B.V., specom.2004.09.009, 18 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.

(56) References Cited

OTHER PUBLICATIONS

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Davis, Z., et al., "A Personal Handheld Multi-Modal Shopping Assistant," 2006 IEEE, 9 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993 IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

(56) References Cited

OTHER PUBLICATIONS

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Roddy, D., et al., "Communication and Collaboration in a Landscape of B2B eMarketplaces," VerticalNet Solutions, white paper, Jun. 15, 2000, 24 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

SRI2009, "SRI Speech: Products: Software Development Kits: EduSpeak," 2 pages, available at http://web.archive.org/web/20090828084033/http://www.speechatsri.com/products/eduspeak.shtml.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," BYTE, vol. 19, No. 7, Jul. 1, 1994, 9 pages.

Van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

(56) References Cited

OTHER PUBLICATIONS

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralisnn and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

(56) References Cited

OTHER PUBLICATIONS

Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.

(56) References Cited

OTHER PUBLICATIONS

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages. Best Copy Available.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., "Abductive Equivalential Translation and its application to Natural Language Database Interfacing," Sep. 1993 Dissertation paper, SRI International, 163 pages.

Rayner, M., et al., "Adapting the Core Language Engine to French and Spanish," May 10, 1996, Cornell University Library, 9 pages. http://arxiv.org/abs/cmp-lg/9605015.

(56) References Cited

OTHER PUBLICATIONS

Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System."
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
International Search Report and Written Opinion dated Aug. 23, 2013, received in International Application No. PCT/US2013/041225, which corresponds to U.S. Appl. No. 13/894,350, 11 pages (Gruber).
Notice of Preliminary Rejection for Korean Patent Application No. 10-2014-7033380, dated Oct. 22, 2015, filed on May 15, 2013, 5 pages.
Office Action received for Chinese Patent Application No. 201380028514.1, dated Apr. 10, 2018, 15 pages (6 pages of English Translation and 9 pages of Official Copy).
Decision to Grant recehed for Japanese Patent Application No. 2017-032503, dated Aug. 17, 2018, 4 pages (1 page of English Translation and 3 pages of Official Copy).
Notice of Allowance received for Japanese Patent Application No. 2015-512803, dated Jan. 27, 2017, 3 pages (Official copy only) (See Communication under 37 CFR § 1.98(a) (3)).
Office Action received for Australian Patent Application No. 2013262796 dated Jul. 6, 2016, 3 pages.

(56) References Cited

OTHER PUBLICATIONS

Office Action received for Australian Patent Application No. 2016213815, dated Jun. 27, 2017, 3 pages.
Office Action received for Australian Patent Application No. 2013262796, dated Aug. 11, 2015, 3 pages.
Office Action received for Chinese Patent Application No. 201380028514.1, dated Jul. 4, 2017, 9 pages (3 pages of English Translation and 6 pages of Official copy).
Office Action received for Chinese Patent Application No. 201380028514.1, dated Oct. 17, 2016, 13 pages (3 pages of English Translation and 10 pages of Official Copy).
Office Action received for Japanese Patent Application No. 2015-512803, dated Feb. 29, 2016, 6 pages (3 pages of English Translation and 3 pages of Official Copy).
Office Action received for Korean Patent Application No. 10-2014-7033380, dated Jun. 29, 2016, 11 (5 pages of English Translation and 6 pages of Official Copy).
Office Action received for Korean Patent Application No. 10-2014-7033380, dated Oct. 22, 2015, 12 pages (5 pages of English Translation and 7 pages of Official Copy).
Office Action received for Korean Patent Application No. 10-2017-7035093, dated Mar. 12, 2018, 9 pages (4 pages of English Translation and 5 pages of Official Copy).
Office Action received for Korean Patent Application No. 10-2014-7033380, dated Mar. 30, 2017, 7 pages (3 pages of English Translation and 4 pages of Official Copy).
Office Action received for Korean Patent Application No. 10-2017-7018070, dated Sep. 5, 2017, 2 pages (Official copy only) (See Communication under 37 CFR § 1.98(a) (3)).
Office Action received for Japanese Patent Application No. 2017-032503, dated May 18, 2018, 5 pages (2 pages of English Translation and 3 pages of Official copy).
Office Action received for Australian Patent Application No. 2016213815, dated Jun. 26, 2018, 6 pages.
Office Action received for Australian Patent Application No. 2016213815, dated Apr. 24, 2018, 4 pages.
Su, Joseph C., "A Review of Telesensory's Vista PCI Screen Magnification System", Journal of Visual Impairment & Blindness, Oct. 1998, pp. 705, 707-710.
Su et al., "A Review of ZoomText Xtra Screen Magnification Program for Windows 95", Journal of Visual Impairment & Blindness, Feb. 1998, pp. 116-119.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al., "Latent Perceptual Mapping with Data-Driven Variable-Length Acoustic Units for Template-Based Speech Recognition", ICASSP 2012, Mar. 2012, pp. 4125-4128.
T3 Magazine, "Creative MuVo TX 256MB", available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Office Action received for Chinese Patent Application No. 201380028514.1, dated Mar. 25, 2019, 9 pages (4 pages of English Translation and 5 pages of Official copy).
Office Action received for Korean Patent Application No. 10-2017-7035093, dated Mar. 25, 2019, 9 pages (4 pages of English Translation and 5 pages of Official Copy).
Office Action received for Chinese Patent Application No. 201380028514.1, dated Nov. 13, 2018, 13 pages (5 pages of English Translation and 8 pages of Official Copy).
Office Action received for Korean Patent Application No. 10-2017-7035093, dated Dec. 28, 2018, 6 pages (3 pages of English Translation and 3 pages of Official Copy).
Office Action received for Australian Patent Application No. 2018204661, dated Jun. 18, 2019, 5 pages.

* cited by examiner

SYSTEMS AND METHODS FOR INTEGRATING THIRD PARTY SERVICES WITH A DIGITAL ASSISTANT

RELATED APPLICATIONS

This application claims priority to U.S. Provisional Patent Application Ser. No. 61/799,916, filed Mar. 15, 2013, entitled "Systems and Methods for Integrating Third Party Services with a Digital Assistant" and U.S. Provisional Patent Application Ser. No. 61/647,434, filed May 15, 2012, entitled "Systems and Methods for Integrating Third Party Services with a Digital Assistant." Both of these applications are incorporated by reference herein in their entirety.

TECHNICAL FIELD

The disclosed embodiments relate generally to digital assistant systems, and more specifically, third party computer systems and services integrated with a digital assistant system.

BACKGROUND

Just like human personal assistants, digital assistant systems can perform requested tasks and provide requested advice, information, or services. A digital assistant system's ability to fulfill a user's request is dependent on the digital assistant system's correct comprehension of the request or instructions. Recent advances in natural language processing have enabled users to interact with digital assistant systems using natural language, in spoken or textual forms. Such digital assistant systems can interpret the user's input to deduce the user's intent, translate the deduced intent into actionable tasks and parameters, execute operations or deploy services to perform the tasks, and produce output that is intelligible to the user. Ideally, the output produced by a digital assistant system should fulfill the user's intent expressed during the natural language interaction between the user and the digital assistant system.

The ability of a digital assistant system to produce satisfactory responses to user requests depends on the natural language processing, knowledge base, and artificial intelligence available to the digital assistant system. Moreover, while numerous third party systems and services currently exist, there is no efficient means for a digital assistant system to integrate efficiently with such third party computer systems and services.

SUMMARY

As described above, there is a need for digital assistant systems to integrate with third party computer systems and services that have access to databases otherwise not available to the digital assistant systems. This enables the digital assistant systems to perform tasks that the digital assistant systems cannot otherwise perform.

The embodiments disclosed herein provide methods, systems, and computer readable storage media that integrate a digital assistant system with one or more third party service provider systems to generate a response to a user request based on information or assistance obtained from at least one of the one or more third party service provider systems.

Some embodiments provide a method for processing a user input performed at an electronic device with one or more processors and memory. This method includes receiving a first set of one or more predefined task types from a service provider, and integrating the first set of one or more predefined task types with a second set of predefined task types not associated with the service provider to generate a plurality of predefined tasks. The method also includes receiving an input of a user, and, in accordance with the input, identifying a respective task type from the plurality of predefined task types. The respective task type corresponds to one of the first set of one or more predefined task types. The method further includes, in response to identifying the respective task type, sending to the service provider a request to perform at least a portion of a task associated with the input.

In some embodiments, a method for processing a user input, performed at an electronic device with one or more processors and memory, includes receiving an input of a user, and, in accordance with the input, identifying a respective task type from a plurality of predefined task types associated with a plurality of third party service providers. The respective task type is associated with at least one third party service provider for which the user is authorized and at least one third party service provider for which the user is not authorized. The method also includes, in response to identifying the respective task type, sending a request to perform at least a portion of a task to a third party service provider of the plurality of third party service providers that is associated with the respective task type.

In some embodiments, a method for processing a user input, performed at an electronic device with one or more processors and memory, includes receiving an input of a user, and, in accordance with the input, identifying a respective task type from a plurality of predefined task types. The method also includes, in response to identifying the respective task type, locating one or more service providers. Each located service provider is associated with an identification of one or more supported task types (also called herein "competencies"), and the one or more supported task types for the service provider include the respective task type. The method further includes, after locating the one or more service providers, sending a request to perform at least a portion of a task to a service provider of the one or more service providers.

In some embodiments, a method for processing a user input, performed at a server system with one or more processors and memory, includes identifying a location of a portable electronic device associated with a user, identifying a respective domain corresponding to the location of the portable electronic device associated with the user, receiving an input of the user, and, in accordance with the input, identifying a respective task type corresponding to the respective domain. The method also includes, in response to identifying the respective task type, sending a request, associated with the input, to perform at least a portion of a task to a respective service provider associated with the respective domain.

In some embodiments, the input is a voice input of the user.

In accordance with some embodiments, an electronic device includes one or more processors and memory storing one or more programs for execution by the one or more processors. The one or more programs include instructions for performing the operations of any of the methods described above. In accordance with some embodiments, a graphical user interface on an electronic device with a display, memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions, which, when executed by an electronic device with one or more processors and memory, cause the device to perform the operations of any of the methods described above. In accordance with some embodiments, an electronic device includes means for performing the operations of any of the methods described above. In accordance with some embodiments, an information processing apparatus, for use in an electronic device includes means for performing the operations of any of the methods described above. In accordance with some embodiments, an electronic device includes a processing unit configured to perform the operations of any of the methods described above.

Thus, digital assistant systems are provided with new and improved methods that integrate third party service providers, thereby improving and expanding the capabilities of the digital assistant systems. Such methods and systems may complement or replace existing methods and systems.

BRIEF DESCRIPTION OF THE DRAWINGS

Like reference numerals refer to corresponding parts throughout the drawings.

DESCRIPTION OF EMBODIMENTS

Figure 1:
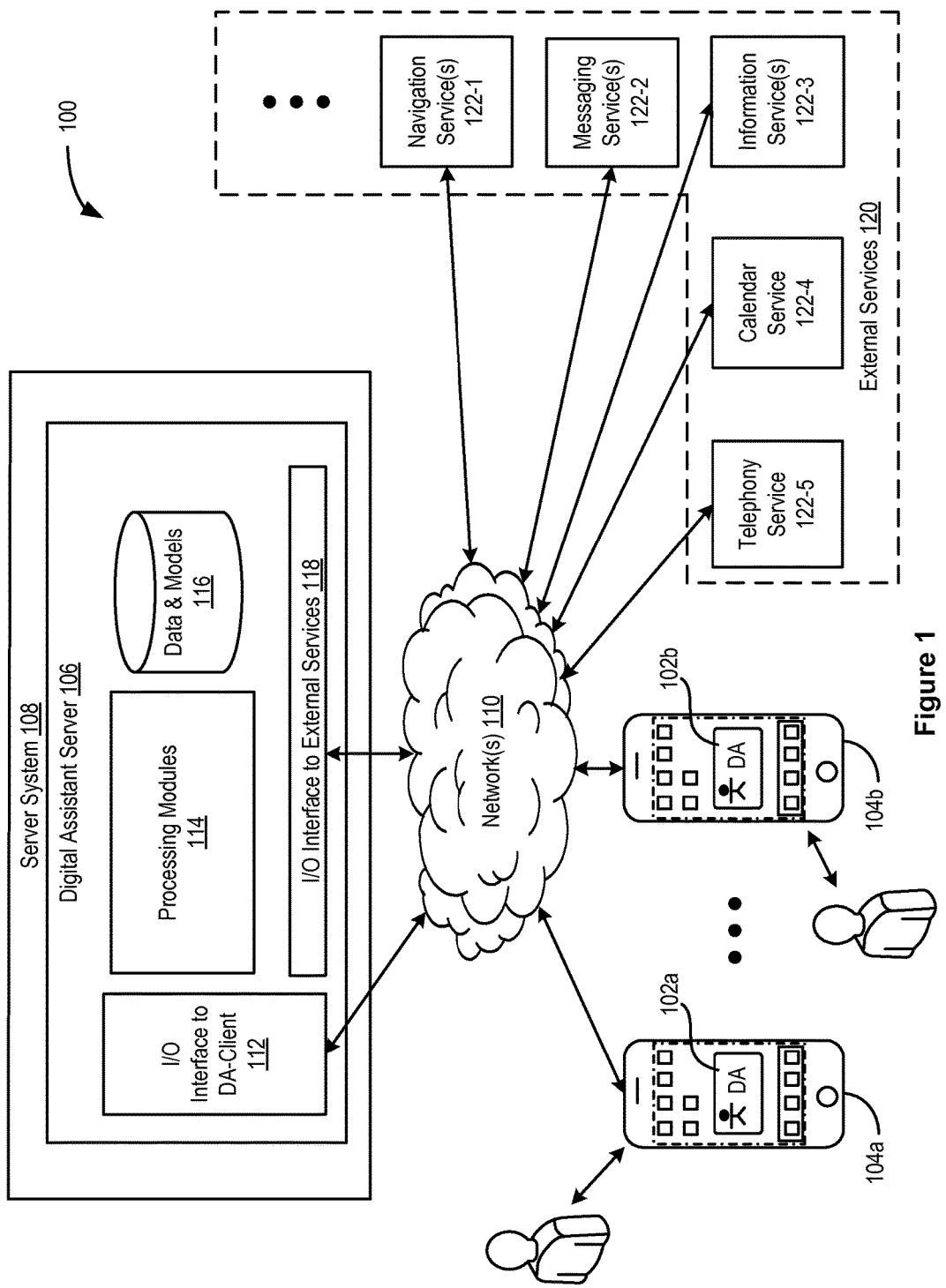
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some embodiments, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device).

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent.

In some embodiments, the DA server 106 communicates with external services 120 (e.g., navigation service(s) 122-1, messaging service(s) 122-2, information service(s) 122-3, calendar service 122-4, telephony service 122-5, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client-side portion (e.g., the DA client 102) and a server-side portion (e.g., the DA server 106), in some embodiments, a digital assistant system refers only to the server-side portion (e.g., the DA server 106). In some embodiments, the functions of a digital assistant can be implemented as a standalone application installed on a user device. In addition, the divisions of functionalities between the client and server portions of the digital assistant can vary in different embodiments. For example, in some embodiments, the DA client 102 is a thin-client that provides only user-facing input and output processing functions, and delegates all other functionalities of the digital assistant to the DA server 106. In some other embodiments, the DA client 102 is configured to perform or assist one or more functions of the DA server 106.

Figure 2:
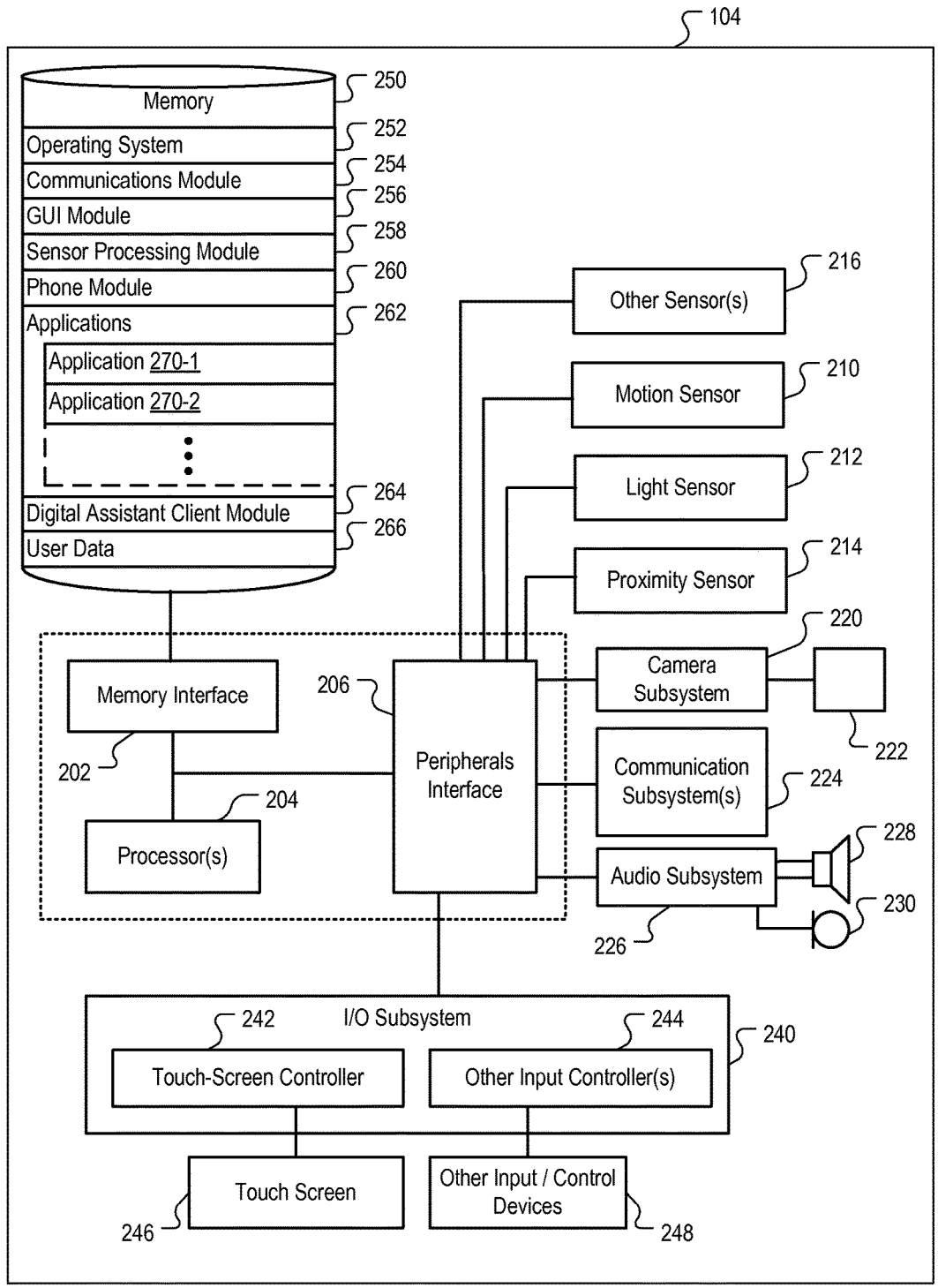
FIG. 2 is a block diagram illustrating a digital assistant client system in accordance with some embodiments.

FIG. 2 is a block diagram of a user device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some embodiments, a motion sensor 210, a light sensor 212, and a proximity sensor 214 are coupled to the peripherals interface 206 to facilitate orientation, light, and proximity sensing functions. In some embodiments, other sensors 216, such as a positioning system (e.g., GPS receiver), a temperature sensor, a biometric sensor, and the like, are connected to the peripherals interface 206, to facilitate related functionalities.

In some embodiments, the user device 104 includes a camera subsystem 220 coupled to the peripherals interface 206. In some embodiments, an optical sensor 222 of the camera subsystem 220 facilitates camera functions, such as taking photographs and recording video clips. In some embodiments, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters. In some embodiments, the user device 104 includes an audio subsystem 226 coupled to one or more speakers 228 and one or more microphones 230 to facilitate voice-enabled functions, such as voice recognition, voice replication, digital recording, and telephony functions.

In some embodiments, an I/O subsystem 240 is also coupled to the peripheral interface 206. In some embodiments, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically configured to, for example, detect contact and movement or break thereof using any of a plurality of touch sensitivity technologies, such as capacitive, resistive, infrared, surface acoustic wave technologies, proximity sensor arrays, and the like. In some embodiments, the user device 104 includes a display that does not include a touch-sensitive surface. In some embodiments, the user device 104 includes a separate touch-sensitive surface. In some embodiments, the user device 104 includes other input controller(s) 244. When the user device 104 includes the other input controller(s) 244, the other input controller(s) 244 are typically coupled to other input/control devices 248, such as one or more buttons, rocker switches, thumb-wheel, infrared port, USB port, and/or a pointer device such as a stylus.

The memory interface 202 is coupled to memory 250. In some embodiments, the memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some embodiments, the memory 250 stores an operating system 252, a communications module 254, a graphical user interface module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The application module 262 facilitates various functionalities of user applications, such as electronic-messaging, web browsing, media processing, navigation, imaging and/or other processes and functions. In some embodiments, the user device 104 stores in the memory 250 one or more software applications 270-1 and 270-2 each associated with at least one of the external service providers.

As described above, in some embodiments, the memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some embodiments, the digital assistant client module 264 utilizes various sensors, subsystems and peripheral devices to gather additional information from the surrounding environment of the user device 104 to establish a context associated with a user input. In some embodiments, the digital assistant client module 264 provides the context information or a subset thereof with the user input to the digital assistant server (e.g., the digital assistant server 106, FIG. 1) to help deduce the user's intent.

In some embodiments, the context information that can accompany the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signals strength, etc. In some embodiments, information related to the software state of the user device 106, e.g., running processes, installed programs, past and present network activities, background services, error logs, resources usage, etc., of the user device 104 is also provided to the digital assistant server (e.g., the digital assistant server 106, FIG. 1) as context information associated with a user input.

In some embodiments, the DA client module 264 selectively provides information (e.g., at least a portion of the user data 266) stored on the user device 104 in response to requests from the digital assistant server. In some embodiments, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some embodiments, the memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
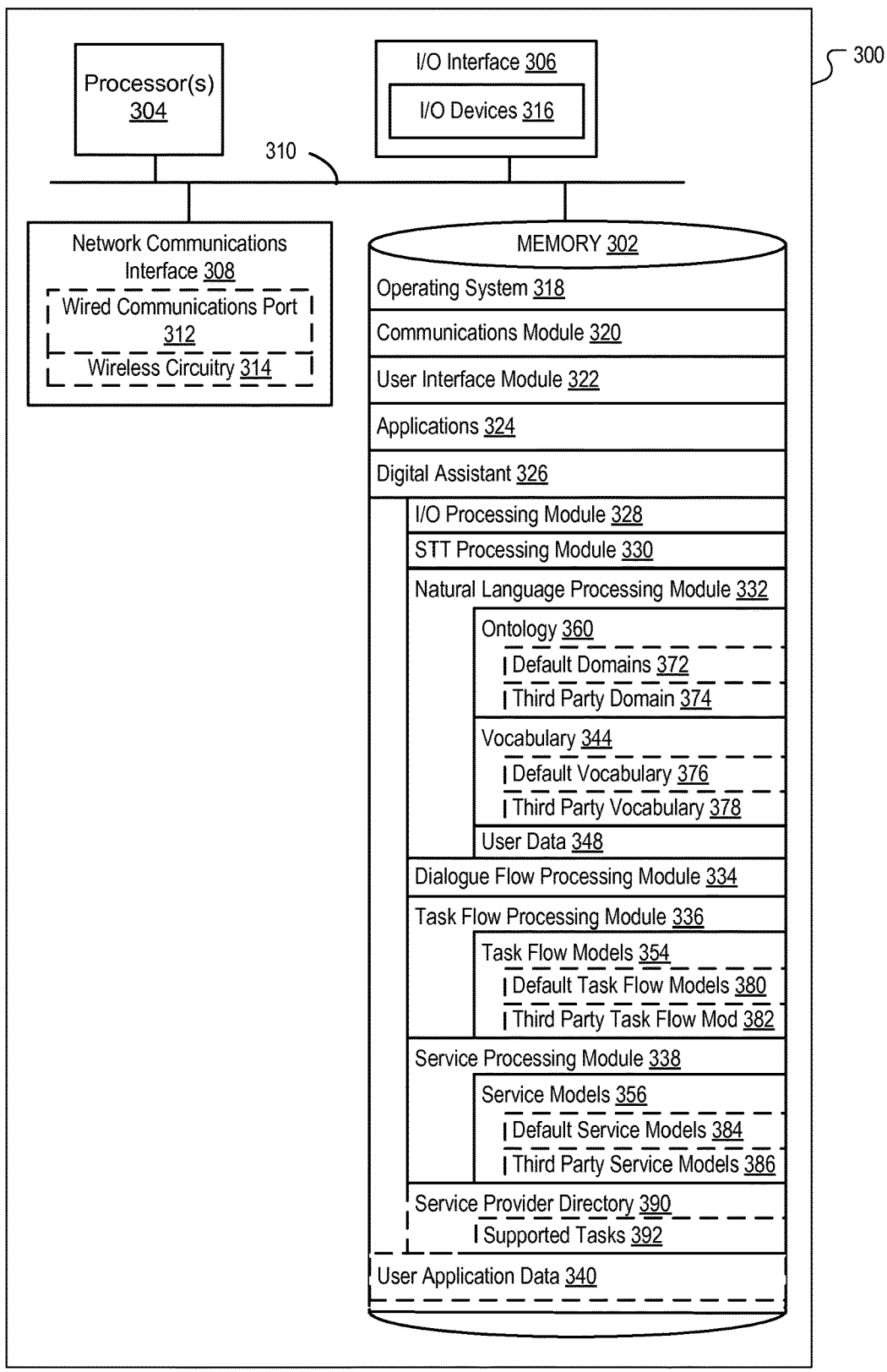
FIG. 3A is a block diagram illustrating a standalone digital assistant system or a digital assistant server system in accordance with some embodiments.

FIG. 3A is a block diagram of an exemplary digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. In some embodiments, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some embodiments, when the digital assistant is implemented on a standalone user device, the digital assistant system 300 includes any of the components and I/O and communication interfaces described with respect to the user device 104 in FIG. 2 (e.g., one or more microphones 228). In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some embodiments, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, and a service processing module 338. Each of these processing modules has access to one or more of the following data and models of the digital assistant 326, or a subset or superset thereof: ontology 360, vocabulary index 344, user data 348, task flow models 354, and service models 356.

In some embodiments, the ontology 360 includes one or more third party domains 374. In some embodiments, the digital assistant system 300 includes one or more default domains 372.

In some embodiments, the one or more default domains 372 include one or more private domains. In some embodiments, the one or more third party domains 374 include one or more public domains. In some embodiments, the one or more third party domains 374 include one or more developer domains.

In some embodiments, the vocabulary 344 includes one or more third party vocabularies 378. In some embodiments, the vocabulary 344 includes one or more default vocabularies 376.

In some embodiments, the task flow models 354 include one or more third party task flow models 382. In some embodiments, the task flow models 354 include one or more default task flow models 380.

In some embodiments, the service models 356 include one or more third party service models 386. In some embodiments, the service models 356 include one or more default service models 384.

In some embodiments, the memory 302 also stores a service provider directory 390. In some embodiments, the service provider directory 390 includes a list of supported tasks or competencies 392 for respective third party service provider systems.

In some embodiments, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the digital assistant also takes appropriate actions when a satisfactory response was not or could not be provided to the user for various reasons.

In some embodiments, the memory 302 also includes a user application data 340, which identifies one or more software applications a respective user is authorized to use. In some embodiments, the user application data 340 also includes the frequency and recency (i.e., indication of how recently the one or more software applications were used) of use of the one or more software applications. In some embodiments, the user application data 340 is included in the user data 348.

In some embodiments, a server of a third party service provider (e.g., external services 120 in FIG. 1) also includes components shown in FIG. 3A (e.g., ontology 360, task flow models 354, etc.).

Figure 3B:
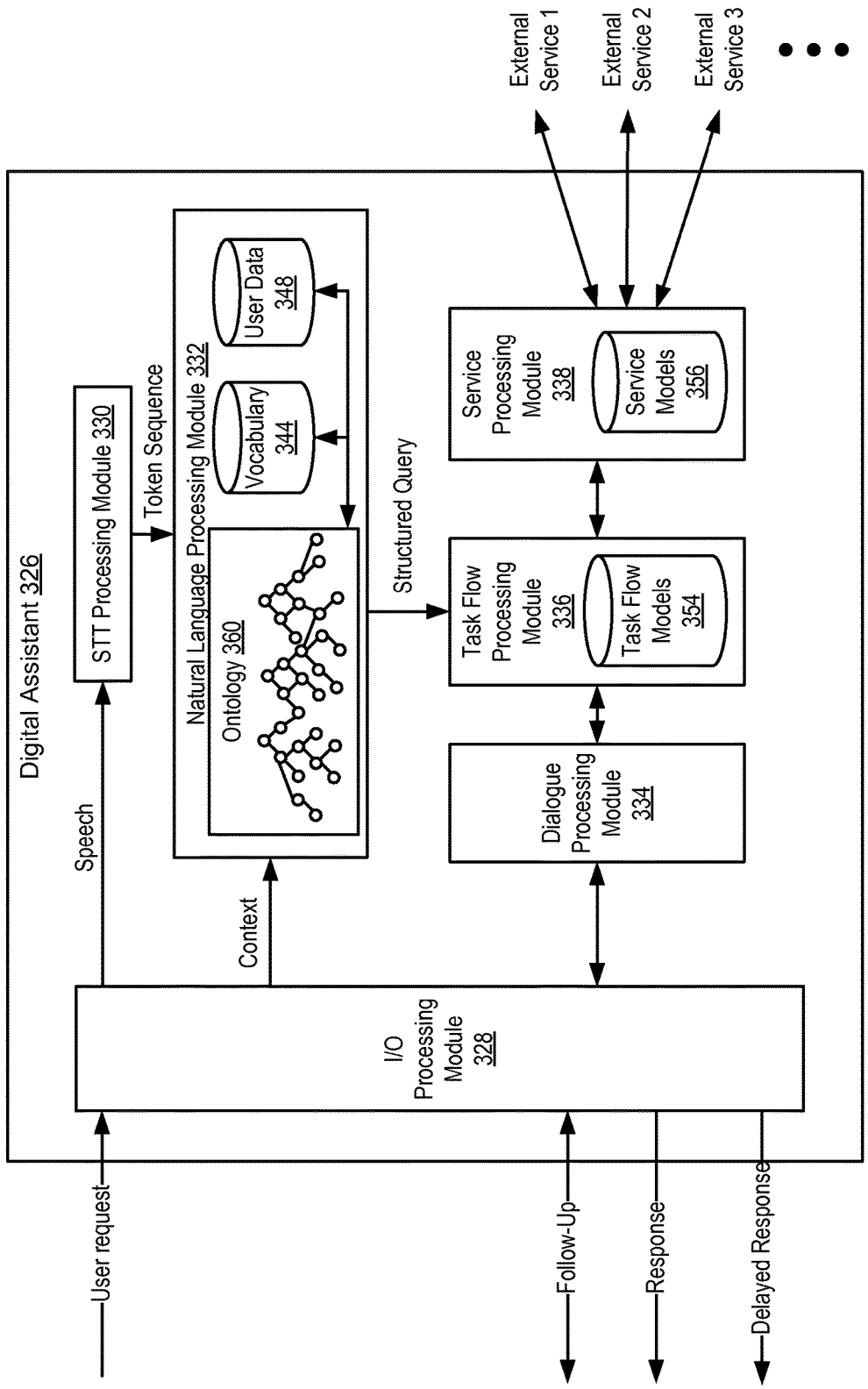
FIG. 3B is a block diagram illustrating functions of the digital assistant shown in FIG. 3A in accordance with some embodiments.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to the speech-to-text (STT) processing module 330 for speech-to-text conversions.

In some embodiments, the speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties". As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (an actionable intent node). In addition, property nodes "cuisine," "price range," "phone number," and "location" are sub-nodes of the property node "restaurant," and are each linked to the "restaurant reservation" node through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property node "date/time" is relevant to both the task of making a restaurant reservation and the task of setting a reminder, the property node "date/time" is linked to both the "restaurant reservation" node and the "set reminder" node in the ontology 360. The ontology 360 shown in FIG. 3C further includes a "restaurant review" node, which is an actionable intent node. Property nodes "review" (e.g., user comments), "rating" (e.g., numerical scores), and "restaurant" are each directly linked to the "restaurant review" node. Since the property node "restaurant" is relevant to both the task of making a restaurant reservation and the task of retrieving a restaurant review, the property node "restaurant" is linked to both the "restaurant reservation" node and the "restaurant review" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362, an example of a reminder domain 364, and an example of a third party restaurant review domain 366 within the ontology 360. The restaurant reservation domain 362 includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." The restaurant review domain 366 includes the actionable intent node "restaurant review," property nodes "review," "rating," and "restaurant," and sub-property nodes "cuisine," "price range," "phone number," and "location." In some embodiments, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
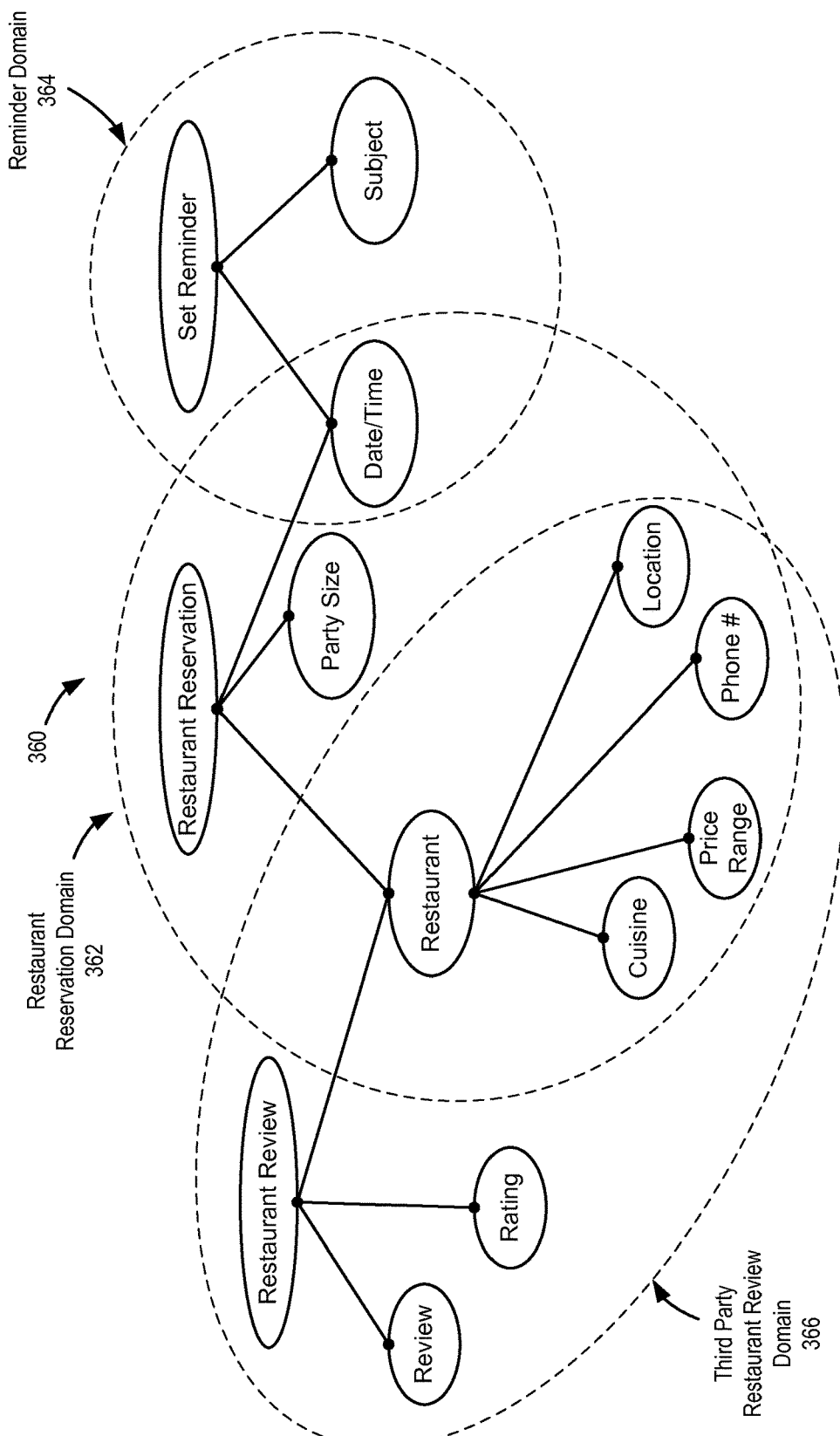
FIG. 3C is a network diagram illustrating a portion of an ontology in accordance with some embodiments.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," and so on. For example, a "send a message" domain is associated with a "send a message" actionable intent node, and may further include property nodes such as "recipient(s)", "message type", and "message body." The property node "recipient" may be further defined, for example, by the sub-property nodes such as "recipient name" and "message address."

In some embodiments, the ontology 360 includes all the domains (and hence actionable intents) that the digital assistant is capable of understanding and acting upon. In some embodiments, the ontology 360 may be modified, such as by adding or removing domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some embodiments, the natural language processor 332 shown in FIG. 3B receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant system 300 has previously correctly interpreted a similar request from a user.

In some embodiments, the digital assistant system 300 also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant system 300 can search and identify specific entity names from other data sources, such as the user's address book, a movies database, a musicians database, and/or a restaurant database. In some embodiments, when the natural language processor 332 identifies that a word in the token sequence is a name of a specific entity (such as a name in the user's address book), that word is given additional significance in selecting the actionable intent within the ontology for the user request.

For example, when the words "Mr. Santo" is recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, if the user requested a sushi restaurant "near me," the natural language processor 332 may populate a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent.

In some embodiments, the digital assistant 326 includes a template processing module. In some embodiments, the token sequence generated by the speech-to-text processing module 330 is sent to the template processing module in addition to, or instead of, the natural language processing module 332. The template processing module has access to a plurality of predefined templates. A template typically defines a particular linguistic pattern. Exemplary templates include "play [x]," "play [x] on [y]," "buy [a] from [b]," and "forward [c] to [d]."

In some embodiments, the template processing module is directly coupled with external services. In some embodiments, the template processing module communicates with external services through the service processing module 338. In some embodiments, the service models 356, which include information identifying external services, are associated with a particular template. In some embodiments, a third party service provider sends a request to be associated with a particular template or a particular set of templates, and in response, the information in the service models 356 is updated to indicate that the third party service provider is associated with the particular template or the particular set of templates. In some embodiments, an application (e.g., an application installed on the device) includes information indicating that a corresponding third party service provider is associated with a particular template or a particular set of templates. In some embodiments, subsequent to installing an application, the digital assistant 326 updates the information to reflect that the corresponding third party service provider is associated with a particular template or a particular set of templates (e.g., for the device or its user).

In some embodiments, templates are grouped. For example, "play [x]" and "play [x] on [y]" can be grouped together as a set of music (and/or video) templates. In some embodiments, templates are grouped together based on contexts (e.g., location of the device). For example, a set of "in car" video templates includes video templates used while the device is in a car (e.g., templates for playing audio without video of a movie file, templates for controlling car stereo, etc.), and a set of "at home" video templates includes video templates used while the device is at home (e.g., templates for playing both video and audio data of a movie file, templates for controlling a home stereo system, etc.). In another example, a set of "moving" news templates includes news templates used while the device (or its user) is moving (e.g., templates for retrieving short stories, headlines, and/or text-only stories that are better suited for reviewing when the user is driving about town), and a set of "stationary" news templates includes news templates used while the device (or its user) is stationary (e.g., templates for retrieving long stories and/or graphics that are better suited for reviewing when the user has more time to review). In some embodiments, third party service providers are associated with one or more templates and not with some other templates. For example, new service provider XYZ may be associated with "moving" news templates, but not with "stationary" news templates, while new service provider JKL may be associated with both "moving" and "stationary" news templates.

In some embodiments, one or more templates are provided by one or more third party service providers. For example, a third party service provider sends a template to the digital assistant 326, and the digital assistant 326 integrates the received template with the plurality of predefined templates. This allows third party service providers to create templates with a new vocabulary (e.g., "tweet [x]"). In some embodiments, the received template also includes one or more synonyms for the new vocabulary.

In some embodiments, the digital assistant 326 determines that the received input corresponds to at least one predefined template and at least one third party provided template, and selects a predefined template. In other words, a predefined template has priority over a third-party provided template.

In some embodiments, the templates include templates in multiple languages. For example, the templates may include a first template in English, and a second template in Spanish. In some embodiments, the first template corresponds to the second template (e.g., both the first template and the second template are for a same action).

In some embodiments, the digital assistant 326 receives an input that corresponds to a predefined template, and in response, sends the input to a particular third party service provider. For example, in some embodiments, the input is "play [x] on [y]" and the digital assistant 326 sends the input (e.g., a speech data or a corresponding text) to a third party service provider that corresponds to [y].

In some embodiments, the digital assistant 326 receives an input that corresponds to a particular template while displaying a user interface of an application that corresponds to a particular third party service provider, determines that the particular template is associated with the particular third party service provider, and sends the input to the particular third party service provider. For example, the digital assistant receives an input "forward [x] to [y]," while displaying a messaging application (e.g., email or SMS application), and forwards the input to a third party service provider that corresponds to the displayed or open messaging application. In some embodiments, the digital assistant 326 determines that the particular template is not associated with the particular third party service provider, and disregards the input.

In some embodiments, the digital assistant 326 receives a user input while displaying a user interface of a particular application, and determines whether the input corresponds to one or more templates associated with the particular application. In accordance with a determination that the input corresponds to one or more templates associated with the particular application, the digital assistant 326 sends the input to the third party service provider associated with the particular application. For example, the digital assistant 326 receives a user input "play [x]" while displaying a user interface of a particular music player application, and sends the input to a third party service player associated with the particular music player application (even if multiple music service providers are associated with the same template).

In some embodiments, the digital assistant 326 receives a user input, and determines that the user input corresponds to a particular template that is associated with multiple third party service providers. The digital assistant 326 selects one of the multiple third party service providers associated with the particular template, and sends the user input to the selected third party service provider. In some embodiments, the selection of a third party service provider is based on a review of the multiple third party service providers. In some embodiments, the selection of a third party service provider is based on a priority ranking of the multiple third party service providers. In some embodiments, the priority ranking of the multiple third party service providers is based on an amount each third party service provider has agreed to pay to be listed on the priority ranking. For example, a third party service provider that makes a high bid is ranked higher than a third party service provider that makes a lower or no bid.

In some embodiments, the digital assistant 326 receives a user input, and determines that the user input corresponds to a particular template that is associated with multiple third party service providers. The digital assistant 326 sends the user input to two or more third party service providers, and receives an acknowledgement indicating whether a respective third party service provider is available. In some embodiments, the digital assistant 326 determines that only one third party service provider is available and select the available third party service provider. In some embodiments, the digital assistant 326 determines that a particular service provider has provided the acknowledgement faster than the remainder of the multiple third party service providers, and selects the particular service provider.

In some embodiments, template selection rules are published so that all third party service providers may know the template selection rules.

In some embodiments, the third party service provider includes a third party digital assistant. The third party digital assistant is similar to the digital assistant 326 described herein. In some embodiments, the third party digital assistant includes an ontology (similar to the ontology 360), third party vocabulary (similar to vocabulary 344), third party user data (similar to user data 348), and one or more third party task flow models (similar to task flow models 354). The third party service provider receives the input and processes the received input with the third party digital assistant in a manner similar to the operations of the digital assistant 326 described herein. The third party service provider provides results to the digital assistant 326, and the digital assistant 326 causes the results to be presented to the user (e.g., in a dialogue user interface for the digital assistant 326 or as a voice output). In some embodiments, the results from the third party digital assistant are output using a voice different from a voice used for outputting results not from the third party digital assistant.

In some embodiments, the digital assistant 326 receives a request to disambiguate an input from a third party service provider. For example, the digital assistant 326 sends a user input "play Rock and Roll" to a music service provider, and the music service provider sends a request back to the digital assistant 326 to disambiguate to the digital assistant 326. In this case, the request may include a request to disambiguate whether to play a radio station with rock and roll music or to play a song entitled "Rock and Roll."

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue flow processing module 334 to engage in a dialogue with the user. In some embodiments, the dialogue flow processing module 334 determines how (and/or when) to ask the user for the additional information, and receives and processes the user responses. In some embodiments, the questions are provided to and answers are received from the users through the I/O processing module 328. For example, the dialogue flow processing module 334 presents dialogue output to the user via audio and/or visual output, and receives input from the user via spoken or physical (e.g., touch gesture) responses. Continuing with the example above, when the task flow processor 336 invokes the dialogue flow processing module 334 to determine the "party size" and "date" information for the structured query associated with the domain "restaurant reservation," the dialogue flow processing module 334 generates questions such as "For how many people?" and "On which day?" to pass to the user. Once answers are received from the user, the dialogue flow processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue flow processing module 334 disambiguate this property of the structured query. In turn, the dialogue flow processing module 334 may ask the user "Which Bob?", and display (or read) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website, a banking portal, etc.). In some embodiments, the protocols and application programming interfaces (API) required by each service can be specified by a respective service model among the services models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

As explained above, in some embodiments, the one or more default domains 372 include one or more private domains. In some embodiments, the one or more private domains include a domain that corresponds to a task that does not require an external service (e.g., external service 120 in FIG. 1). In some embodiments, the one or more private domains include a domain that corresponds to a default service provider (e.g., a private domain corresponds to a task that requires an external service from the default service provider). For example, a private domain may include a calendar service domain that is used for storing and/or retrieving a calendar event, and the calendar service domain corresponds to a task that requires calendar event storing and/or retrieving services from a default calendar service provider. In some embodiments, a private domain is owned by a developer of the device or the digital assistant 326 (e.g., APPLE Inc.). Thus, user interfaces and content are both under control of the developer of the device or the digital assistant 326.

As explained above, in some embodiments, the one or more third party domains 374 include one or more public domains. In some embodiments, the one or more public domains are developed by a developer of the device or the digital assistant 326, whereas content is provided from a third party.

In some embodiments, the one or more third party domains 374 include one or more developer domains. In some embodiments, both a public domain and a developer domain correspond to tasks that require an external service from one or more third party service providers. As used herein, a third party service provider is a service provider other than a default service provider. In some embodiments, a public domain is not developed by a third party service provider (e.g., a public domain developed by a manufacturer of the device based on information available from a third party service provider). In some embodiments, a developer domain is developed by a third party service provider. In some embodiments, a developer domain corresponds to a task flow model 354 developed by a third party service provider and/or a dialogue flow model developed by a third party service provider for processing by the dialogue flow processing module 334 (FIG. 3B). In some embodiments, the developer domain is stored at a server of a third party service provider (e.g., external services 120).

In some embodiments, the natural language processor 332, dialogue flow processing module 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

Figure 4A:
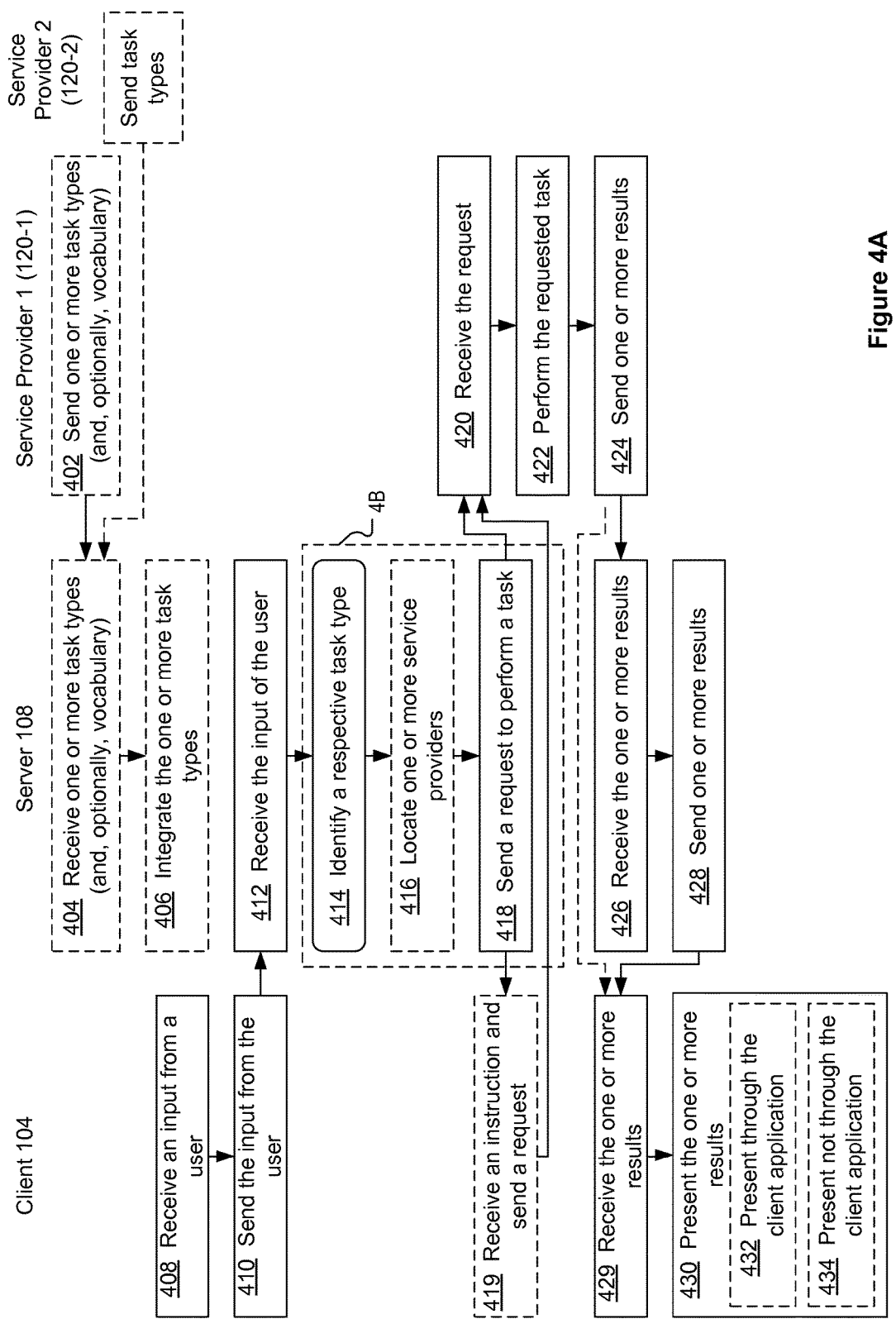
FIGS. 4A-4B are flow charts illustrating operations performed by a client system, a server system, and a service provider system in accordance with some embodiments.
Figure 4B:
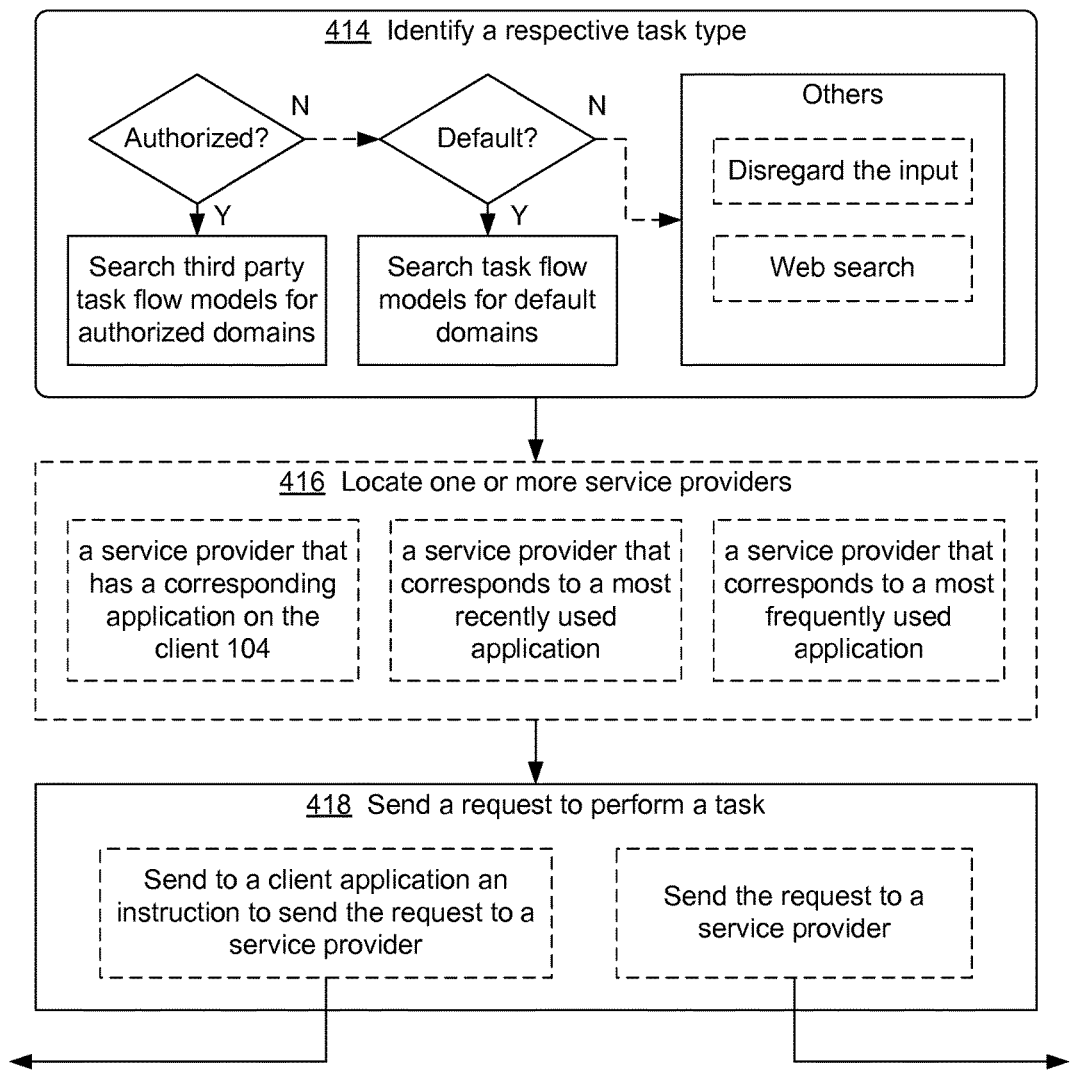

FIGS. 4A-4B are flow diagrams illustrating exemplary operations undertaken by a DA server, a DA client, and a service provider (e.g., the server system 108, the user device 104a, and a messaging service 122-2 in FIG. 1). These operations are merely exemplary and fewer or less other interactions may be performed by the DA server, the DA client, and service provider(s) in various embodiments.

In some embodiments, the service provider (e.g., Service Provider 1(120-1)) sends (402) one or more task types (e.g., "make a restaurant reservation" and/or "find a match score") to the DA server. In some embodiments, the one or more task types identify one or more task types supported by the service provider. In some embodiments, the service provider sends a vocabulary or an identification of a vocabulary. In some embodiments, the service provider sends domain information (e.g., a data model as illustrated in FIG. 3C) regarding at least one of the one or more task types. In some embodiments, the service provider sends two or more of: the one or more task types, the vocabulary or the identification of the vocabulary, and the domain information.

Typically, a third party service provider and the digital assistant system 300 are not owned by a same person or entity. For example, the digital assistant system 300 is owned by Applicant, APPLE Inc., while the third party service provider is a server owned by a restaurant reservation service provider (e.g., OPENTABLE, Inc.).

In some embodiments, the DA server receives (404) and integrates (406) the one or more task types into the task flow models 354 (e.g., as one or more third party task flow models in the third party task flow models 382). As described above with reference to FIG. 3A, in some embodiments, the task flow models 354 include the third party task flow models 382 and the default task flow models 380, which are not received from a third party service provider. In some embodiments, the task flow models 354 already include existing third party task flow models, and the DA server stores the received one or more task types with the existing third party task flow models. In some embodiments, the DA server performs a task corresponding to a task flow model in the third party task flow models 382. For example, when the digital assistant system 300 (FIG. 3A) is configured to support making restaurant reservations by default (i.e., not using task flow models provided by third party service provider systems), the default task flow models 380 include task flow models for making restaurant reservations. Continuing with the example, when the digital assistant system 300 is configured to provide sports scores based on third party domains 374, the third party task flow models 382 include a flow model for retrieving sports scores (e.g., retrieving sports scores from the Service Provider 1).

In some embodiments, the DA server receives and integrates the vocabulary or the identification of the vocabulary into the vocabulary 344 (e.g., the third party vocabulary 378). As described above with reference to FIG. 3A, in some embodiments, the vocabulary 344 includes the third party vocabulary 378 (or a third party vocabulary index) and the default vocabulary 376 (or a default vocabulary index), which is not received from a third party service provider. For example, in some embodiments, when the digital assistant system 300 (FIG. 3A) is configured to support making restaurant reservations by default (i.e., not using ontology data or vocabulary provided by third party service provider systems), the one or more default vocabulary indices 376 include terms related to making restaurant reservations, such as "restaurant," "reservation," and "party size." In some embodiments, each of these terms is separately affiliated with a list of synonyms. In some embodiments, the default vocabulary 376 also includes restaurant names and/or restaurant locations (e.g., street names). In comparison, the one or more third party vocabulary indices 378, when the digital assistant system 300 is configured to provide sports scores based on third party domains 374, include terms related to sports, such as types of sports (e.g., baseball, basketball, football, soccer, etc.), names of players and teams, and locations of sports events.

Similarly, in some embodiments, the DA server receives and integrates the domain information into the ontology 360 (e.g., the third party domain 374). As described above with reference to FIG. 3A, in some embodiments, the ontology 360 includes the third party domain 374 and the default domains 370 (e.g., the restaurant reservation domain 362 and the reminder domain 364, FIG. 3C), which are not received from a third party service provider. Typically, the one or more third party domains 374 correspond to one or more task types that do not correspond to the default domains 372. For example, in some embodiments, the default domains 372 do not correspond to retrieving sports scores, but one or more third party domains 374 include a "sports scores" domain for addressing sports score queries from users.

In some embodiments, in response to receiving the one or more task types and/or the domain information, the DA server updates the service provider directory 390 and/or the supported tasks 392. The service provider directory 390 typically includes a list of third party service providers that the DA server has access to. The supported tasks 392 typically include a list of task types supported by respective third party service providers and/or a list of third party service providers that support respective task types. For example, the DA server adds the Service Provider 1 to the service provider directory 390 and lists task types supported by the Service Provider 1 in the supported tasks 392 in connection with the Service Provider 1.

In some embodiments, at least one of the one or more third party domains 374 (or information for the one or more third party domains 374) is provided that is location specific. For example, in some embodiments, when the DA client 104 approaches or enters a particular hotel, the hotel's service provider system automatically provides a domain relevant to that hotel to the digital assistant system 300. In some embodiments, the digital assistant system 300 automatically receives the domain relevant to that hotel. In other embodiments, the digital assistant system 300 asks the user whether the user wants to receive the local domain (e.g., the domain relevant to that hotel). In some embodiments, the at least one domain provided by the hotel's service provider system includes tasks or task types related to that particular hotel (e.g., finding room rates, locating restaurant facilities in the hotel, etc.).

In some embodiments, the DA client 104 generates a voice output with a voice having a first set of voice characteristics for tasks associated with default domains 372 and generates a voice output with a voice having a second set of voice characteristics for tasks associated with third party domains 374. For example, the DA client 104 may generate a voice output with a certain female voice for tasks associated with the default domains 372, and generate a voice output with a certain male voice for tasks associated with a third party domain 374. Voice characteristics may include one or more of pitch, speed, and volume, and/or characteristics typical to a particular group of speakers classified based on, for example, gender (e.g., male or female), age (e.g., adult or child), and accents. In some embodiments, respective third party domains are associated with respective voices having respective sets of voice characteristics. For example, a first third party domain may be associated with a voice having a third set of voice characteristics and a second third party domain may be associated with a voice having a fourth set of voice characteristics. For example, a high-end hotel chain may have a domain associated with a refined accent.

In some embodiments, when the DA client 104 moves away from a predefined location, the DA client automatically removes one or more domains associated with the predefined location. For example, when the DA client 104 moves away from the hotel, the DA client automatically removes one or more domains provided by the hotel's service provider system. In some other embodiments, the DA client retains a predefined number of recently used third party domains (e.g., before receiving a new third party domain, the DA client removes a third party domain stored in the DA client that was used last, also known as the first-in-first-out (FIFO)). In some embodiments, the DA client removes a third party domain based on a frequency of use (e.g., removes a domain that is least frequently used) instead of the time of last use. In yet other embodiments, the DA server asks the DA client whether it wants to remove the one or more domains provided by the hotel's server provider system. In some embodiments, a list of the one or more third party domains 374 available to the DA client is stored in the DA server, and based on the response from the DA client, the DA server removes one or more third party domains from the list. In other embodiments, the list of the one or more third party domains 374 available to the DA client is stored on the DA client, and the DA client removes one or more third party domains from the list.

While these operations (e.g., the operations 402, 404, and 406) are typically performed before a user provides an input (i.e., prior to receiving an input from a user) that would initiate the particular task, these may also be performed in real time after a user provides input.

In some embodiments, another service provider (e.g., Service Provider 2 (120-2)) also sends task types supported by that service provider to the DA server, and the DA server integrates these into the task flow models 354 and/or the service provider directory 390, as described above. However, until the server 108 identifies a task type corresponding to that service provider, the server 108 typically does not send a request to that service provider.

At anytime thereafter, the DA client receives (408) an input (e.g., a voice input) from the user. In some embodiments, the DA client receives the input through one or more microphones. For example, the DA client may receive a voice command of the user, such as "book a restaurant at 7 pm." In some embodiments, the DA client receives the input through a touch-sensitive surface. The DA client sends (410) the input from the user to the DA server, and may also send contextual information, such as the location of the DA client.

The DA server receives (412) the input of the user, and identifies (414) a respective task type as described below in reference to FIG. 4B. In some embodiments, when the input of the user is a voice command, the DA server receives the input as an audio file (or as a string of text corresponding to the speech if the DA client includes a text-to-speech engine). As described above with reference to FIG. 3B, in some embodiments, the DA server uses the digital assistant 326 (FIG. 3B) to identify the respective task type. For example, the DA server may determine from the input of the user that the user wants to make a restaurant reservation (i.e., identify "making a restaurant reservation" as a requested task type). For example, when the user input is "book a restaurant tonight," the identified task type is a restaurant reservation that corresponds to at least one restaurant reservation service provider, and when the user input is "what is the latest Giants' score," the identified task type is retrieving sports scores.

In some embodiments, the device identifies the respective task type in accordance with a vocabulary (or an identification of a vocabulary, such as associating an existing vocabulary with a new task or domain) received from the third party service provider. For example, after receiving an inquiry from the user, "where is Jeremy Lin playing today," the device may determine that the term, Jeremy Lin, matches an entry in a third party vocabulary index from a sports game schedule service provider as an athlete's name, and identify that retrieving a location of a sports game is the requested task. Similarly, after receiving an inquiry from the user, "where is the Hunger Games playing today," the device may determine that the term, the Hunger Games, matches an entry in a third party vocabulary index from a movie schedule/ticketing service provider as a movie title, and identify that retrieving a location of the movie screening is the requested task.

In some embodiments, the DA server locates (416) one or more service providers that can perform the identified task type. In some embodiments, the DA server locates the one or more service providers that can perform the identified task type in accordance with information in the service provider directory 390 and/or the list of supported tasks or competencies 392. By using competencies, the DA server can more efficiently identify service providers that are suitable for an identified task type. For example, two restaurant reservation service providers (e.g., a first restaurant reservation service provider and a second restaurant reservation service provider) may have one or more supported task types including making restaurant reservations, indicating that the two restaurant reservation service providers can provide restaurant reservation services. In another example, one or more supported task types associated with a particular service provider may include "sports schedules," indicating that the particular service provider can provide information about sports game schedules.

In some embodiments, when the DA server locates two or more service providers that can perform the identified task type, the DA server selects one of the two or more service providers. In some other embodiments, the DA server selects multiple service providers of the two or more service providers. In some embodiments, the DA server sends (418) a request to the one or more selected service providers, typically one service provider, to perform a task of the identified task type. Alternatively, in other embodiments, the DA server sends the request to the DA client 104, and the DA client receives the request and sends (419) the request to the one or more selected service providers. In some embodiments, the respective service provider is configured to complete the task. In some other embodiments, the task requires multiple service providers. For example, the task may be "buy tickets for a most popular movie starring actor X." Performing this task may require receiving information from, or performing a task with, a movie ranking service provider, a movie database service provider, and a movie ticket purchase service provider. In other words, each service provider performs a portion of the task, and the device integrates information from multiple selected service providers.

In some embodiments, the DA server locates one or more default service providers that correspond to private domains and one or more third party service providers, both the one or more default service providers and the one or more third party service providers capable of performing the identified task type, and selects one or more default service providers.

The service provider then receives (420) the request, performs (422) the requested task, and sends (424) one or more results relating to the performance of the requested task to the DA server 108.

The DA server 108 receives (426) the one or more results from the service provider, and sends (428) one or more of the one or more results to the DA client 104.

Alternatively, the service provider sends the one or more results directly back to the client 104 (shown by broken arrow between 424 and 429).

The DA client 104 receives (429) the one or more results, and presents (430) the one or more received results to the user (e.g., as an audio output or a visual display). In some embodiments, the DA client 104 presents (432) at least a portion of the one or more received results to the user through a user interface of a software application (e.g., 270-1 or 270-2, FIG. 2) other than the digital assistant client module 264. In some embodiments, the DA client 104 presents (434) at least a portion of the one or more received results to the user not through a user interface of a software application other than the digital assistant client module 264 (e.g., through a user interface of the digital assistant client module 264 or through an audio interface not associated with any particular software application). In some embodiments, the DA client 104 outputs speech of the one or more received results.

FIG. 4B is a flow diagram providing additional details of certain operations illustrated in FIG. 4A.

In some embodiments, identifying (414) a respective task type includes determining whether the user is authorized to use services of one or more third party service providers. In some embodiments, the user is deemed to be authorized for a particular third party service provider when the user is authorized to use a software application associated with the particular third party service provider. For example, if the user has bought an application for a particular service provider (e.g., a restaurant rating service provider), then the user is deemed to be authorized to use services of the particular service provider (and corresponding third party domains 374). If the user is authorized for the one or more third party service providers, the DA server searches the domains (e.g., one or more third party domains 374) in the ontology 360. Once the DA server identifies a relevant domain, the DA server uses an appropriate task flow model associated with the relevant domain (and corresponding to the one or more authorized third party service providers).

In some embodiments, the DA server identifies one or more private domains (e.g., default domains 372) and one or more third party domains (e.g., third party domains 374) and uses an appropriate task flow model associated with a private domain. In other words, in some embodiments, the DA server selects a private domain over a third party domain when both the private domain and the third party domain correspond to the input.

In some embodiments, if the user is not authorized for the one or more third party service providers, or if no authorized third party domain corresponds to the input of the user, the DA server determines whether to search default domains. For example, the DA server determines whether the default domains include a domain that corresponds to the input of the user. If the DA server determines to search the default domains (e.g., the DA server determines that the default domains include a domain that corresponds to the input of the user), the DA server searches the default domains to identify a respective default task flow model that corresponds to the input of the user, and processes the respective default task flow model.

In some embodiments, if the DA server determines not to search the default domains, or if no default domain corresponds to the input of the user, the DA server may perform other actions, such as searching a search engine or a knowledge engine or disregarding the input.

In some embodiments, if the DA server determines not to punt the input of the user, the DA server disregards the input.

In some embodiments, the DA server 108 communicates with the DA client 104. In some embodiments, the DA client 104 stores in the memory 250 one or more software applications 270-1 and 270-2 that corresponds to third party service providers (e.g., ZAGAT software application and YELP application that correspond to different restaurant review providers). As explained above, in some embodiments, the DA server includes the user application data 340.

In some embodiments, the DA server 340 selects a service provider based on one or more software applications that the user is authorized to use, as explained in detail below. In some embodiments, locating (416) the one or more service providers includes locating a third party service provider for which a corresponding application is stored in the DA client (FIG. 1). For example, the digital assistant system 300 may have access to a plurality of restaurant review providers. This is based on an assumption that the user of the DA client 104 is interested in receiving information from the third party service provider, because the user of the DA client 104 chose to store (e.g., install) the corresponding application on the DA client 104. In some embodiments, when the DA client 104 is authorized to use the ZAGAT software application but not the MICHELIN GUIDE application, the DA server selects ZAGAT as a restaurant review provider, and sends a request for restaurant reviews to a ZAGAT server. One reasoning is that the user of the DA client 104 is assumed to have a preference for the ZAGAT restaurant reviews, because the user is authorized to use the ZAGAT software application, but not the MICHELIN GUIDE application.

Although the above example describes the DA client 104 having the software application corresponding to the service provider system, in some embodiments, the DA client 104 need not store the software application corresponding to the service provider system. For example, the user may have purchased the software application, but have not yet downloaded or installed the software application on the DA client 104, or the user may have installed the software application on another DA client owned by the user. Alternatively, the user may have an existing account (e.g., a subscription or a license) with the service provider system. In some embodiments, the user application data 340 identifies one or more software applications the user is authorized to use. In some embodiments, the user application data 340 also identifies one or more service providers that correspond to the one or more software applications the user is authorized to use (e.g., websites or company names associated with the one or more software applications). In some embodiments, the user application data 340 identifies one or more service providers that the user is authorized to use other than default service providers (e.g., service providers all users of the digital assistant system 300 are authorized to use).

In some embodiments, the digital assistant system 300 has access to two or more service provider systems that support a same task type. For example, the two or more service provider systems may be configured to perform tasks of the same task type (e.g., both ZAGAT and YELP for providing restaurant reviews).

In some embodiments, locating (416) the one or more service providers includes locating a service provider that corresponds to a software application that the user has purchased (e.g., ZAGAT over YELP). In some embodiments, locating (416) the one or more service providers includes locating a third party service provider that corresponds to a most recently used application. In some embodiments, locating (416) the one or more service providers includes locating a third party service provider that corresponds to a most frequently used application.

In some embodiments, locating (416) the one or more service providers include multiple service providers. For example, the DA server may select ZAGAT and YELP out of three restaurant review providers, ZAGAT, YELP, and MICHELIN GUIDE, and combine results provided by both ZAGAT and YELP. Alternatively, the DA server may ask the user to choose a preference between ZAGAT and YELP. In some embodiments, the DA server stores the user preference (e.g., in the user data 348). For example, the user may choose to allow certain service providers to provide results to the user. Additionally, or alternatively, the user may choose to block some other service providers from providing results to the user. In some embodiments, the user selects a number of times a particular provider is permitted to provide results (e.g., once per day). In some embodiments, the user selects a number of results a particular provider is permitted to provide in response to each input.

In some embodiments, locating (416) the one or more service providers includes selecting one or more service providers based on an identity of the user. For example, when two news service providers ("XYZ News" and "XYZ Kids") are located, a news service provider is selected based on the identity of the user (e.g., if the user is an adult, select "XYZ News" that is designed for adults, and if the user is a child, select "XYZ Kids" that is designed for children). In some embodiments, the identity of the user is determined from a user profile stored in the device. In some embodiments, the identity of the user is determined from one or more recently used applications, time of day, types of inputs, etc.

In some embodiments, sending (418) a request to perform a task includes sending the request to one or more selected service providers. In turn, the DA server receives (426) the one or more results from one or more of the one or more selected service providers. For example, in some embodiments, the DA server sends the request to multiple service providers (e.g., multiple airlines for ticket pricing) and receives results from a subset of the multiple service providers (e.g., during a predefined time period). This allows the DA server to utilize results provided by those service providers that respond quickly, and avoid unacceptable delays, in waiting for the results, that degrade the user experience.

Then, the DA server sends (428) one or more of the one or more results to the DA client 104 for presentation (e.g., visual or audio) to the user. The DA client 104 receives the one or more results sent by the DA server, and presents (430) at least a portion of the one or more results to the user.

In some embodiments, sending (418) the request includes sending to a third party software application stored in the DA client an instruction to send the request to one or more service providers (e.g., including one or more third party service providers). In turn, the DA client, in response to receiving the instruction from the DA server, sends the request to one or more service providers. Then, the DA client receives one or more results from one or more of the one or more service providers, and presents (430) at least a portion of the one or more results to the client.

In some embodiments, the DA client presents the results through the third party software application stored in the DA client (e.g., the results are displayed in the user interface of the third party software application). For example, the results from the ZAGAT service provider are presented on the user interface of the ZAGAT application stored on the DA client. In some embodiments, the DA client presents the results not through the third party software application (e.g., the results are displayed in the user interface of the digital assistant client module 264, FIG. 2). For example, the results from the ZAGAT service provider are presented on the user interface of the digital assistant client module 264.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device for processing a user input, the device comprising:
   at least one processor; and
   memory storing one or more programs for execution by the at least one processor, the one or more programs including instructions for:
      receiving an input of a user;
      determining a context of the electronic device;
      identifying, based on the received user input and the determined context of the electronic device, a respective template from a plurality of templates, wherein each template of the plurality of templates is associated with a respective context of the electronic device, wherein the identified respective template is from a third party service provider to be associated with a task type based on a first request sent by the third party service provider, wherein the first request corresponds to the task type, and wherein the task type is part of a task flow model having a default model of tasks of task types;
      in response to identifying the respective template, determining, using the task flow model, a task associated with the respective template; and
      sending a second request to perform at least a portion of the task to the third party service provider.

2. The device of claim 1, wherein the input is a voice input of the user that has been converted to text.

3. The device of claim 1, wherein:
   the electronic device is a portable electronic device of the user; and the electronic device stores a software application associated with the third party service provider.

4. The device of claim 3, the one or more programs further comprising instructions for:
   executing the software application for sending the second request.

5. The device of claim 3, the one or more programs further comprising instructions for:
   sending the second request without executing the software application.

6. The device of claim 1, the one or more programs further comprising instructions for:
   receiving results from the third party service provider.

7. The device of claim 6, the one or more programs further comprising instructions for:
   displaying at least a portion of the results to the user through a graphical user interface associated with the software application.

8. The device of claim 6, the one or more programs further comprising instructions for:
   presenting at least a portion of the results to the user through a graphical user interface other than a graphical user interface associated with the software application.

9. The device of claim 1, wherein the first request is sent prior to receiving the input and includes the respective template associated with at least one task that the third party service provider can perform.

10. The device of claim 1, wherein the context is the location of the electronic device.

11. The device of claim 1, wherein at least one third party service provider is associated with less than all of the plurality of templates.

12. The device of claim 1, wherein each of the plurality of templates comprises a linguistic pattern, and wherein identifying the respective template from the plurality of templates comprises:
    identifying one or more matches between words in the linguistic pattern and words in a text string corresponding to the input.

13. The device of claim 1, wherein the identified respective template includes a word not included in any other template of the plurality of templates.

14. The device of claim 13, wherein the identified respective template further includes one or more synonyms for the word.

15. The device of claim 1, wherein the first request includes a third party domain.

16. The device of claim 1, wherein the user input is received while displaying an application corresponding to the third party service provider.

17. The device of claim 1, the one or more programs further comprising instructions for:
    determining whether the user input corresponds to a predefined template and the respective template;
    in accordance with a determination that the user input corresponds to the predefined template and the respective template, sending a third request to perform at least a portion of the task to a default service provider associated with the predefined template.

18. The device of claim 1, wherein the third party service provider is selected from a plurality of third party service providers based on a preference of the user.

19. A method for processing a user input, performed at an electronic device with one or more processors and memory, the method comprising:
   at the electronic device:
   receiving an input of a user;
   determining a context of the electronic device;
   identifying, based on the received user input and the determined context of the electronic device, a respective template from a plurality of templates, wherein each template of the plurality of templates is associated with a respective context of the electronic device, wherein the identified respective template is from a third party service provider to be associated with a task type based on a first request sent by the third party service provider, wherein the first request corresponds to the task type, and wherein the task type is part of a task flow model having a default model of tasks of task types;

in response to identifying the respective template, determining, using the task flow model, a task associated with the respective template; and sending a second request to perform at least a portion of the task to the third party service provider.

20. The method of claim 19, wherein the input is a voice input of the user that has been converted to text.

21. The method of claim 19, further comprising receiving results from the third party service provider.

22. The method of claim 19, wherein the first request is sent prior to receiving the input and includes the respective template associated with at least one task that the third party service provider can perform.

23. The method of claim 19, wherein:
the electronic device is a portable electronic device of the user; and the electronic device stores a software application associated with the third party service provider.

24. The method of claim 23, further comprising:
executing the software application for sending the second request.

25. The method of claim 23, further comprising:
sending the second request without executing the software application.

26. The method of claim 19, further comprising:
receiving results from the third party service provider.

27. The method of claim 26, further comprising:
displaying at least a portion of the results to the user through a graphical user interface associated with the software application.

28. The method of claim 26, further comprising:
presenting at least a portion of the results to the user through a graphical user interface other than a graphical user interface associated with the software application.

29. The method of claim 19, wherein each of the plurality of templates comprises a linguistic pattern, and wherein identifying the respective template from the plurality of templates comprises:
identifying one or more matches between words in the linguistic pattern and words in a text string corresponding to the input.

30. The method of claim 19, wherein the identified respective template includes a word not included in any other template of the plurality of templates.

31. The method of claim 30, wherein the identified respective template further includes one or more synonyms for the word.

32. The method of claim 19, wherein the first request includes a third party domain.

33. The method of claim 19, wherein the user input is received while displaying an application corresponding to the third party service provider.

34. The method of claim 19, further comprising:
determining whether the user input corresponds to a predefined template and the respective template;
in accordance with a determination that the user input corresponds to the predefined template and the respective template, sending a third request to perform at least a portion of the task to a default service provider associated with the predefined template.

35. The method of claim 19, wherein the third party service provider is selected from a plurality of third party service providers based on a preference of the user.

36. A non-transitory computer-readable storage medium storing one or more programs, which, when executed by one or more processors of an electronic device, cause the electronic device to:
receive an input of a user;
determine a context of the electronic device;
identify, based on the received user input and the determined context of the electronic device, a respective template from a plurality of templates, wherein each template of the plurality of templates is associated with a respective context of the electronic device, wherein the identified respective template is from a third party service provider to be associated with a task type based on a first request sent by the third party service provider, wherein the first request corresponds to the task type, and wherein the task type is part of a task flow model having a default model of tasks of task types;
in response to identifying the respective template, determine, using the task flow model, a task associated with the respective template; and
send a second request to perform at least a portion of the task to the third party service provider.

37. The computer readable storage medium of claim 36, wherein the input is a voice input of the user that has been converted to text.

38. The computer readable storage medium of claim 36, wherein the one or more programs further comprise instructions, which when executed by the one or more processors, cause the electronic device to:
receive results from the third party service provider.

39. The computer readable storage medium of claim 36, wherein the first request is sent prior to receiving the input and includes the respective template
associated with at least one task that the third party service provider can perform.

40. The computer readable storage medium of claim 36, wherein:
the electronic device is a portable electronic device of the user; and the electronic device stores a software application associated with the third party service provider.

41. The computer readable storage medium of claim 40, wherein the one or more programs further comprise instructions, which when executed by the one or more processors, cause the electronic device to:
execute the software application for sending the second request.

42. The computer readable storage medium of claim 40, wherein the one or more programs further comprise instructions, which when executed by the one or more processors, cause the electronic device to:
send the second request without executing the software application.

43. The computer readable storage medium of claim 36, wherein the one or more programs further comprise instructions, which when executed by the one or more processors, cause the electronic device to:
receive results from the third party service provider.

44. The computer readable storage medium of claim 43, wherein the one or more programs further comprise instructions, which when executed by the one or more processors, cause the electronic device to:
display at least a portion of the results to the user through a graphical user interface associated with the software application.

45. The computer readable storage medium of claim 43, wherein the one or more programs further comprise instructions, which when executed by the one or more processors, cause the electronic device to:

present at least a portion of the results to the user through a graphical user interface other than a graphical user interface associated with the software application.

46. The computer readable storage medium of claim 36, wherein each of the plurality of templates comprises a linguistic pattern, and wherein identifying the respective template from the plurality of templates comprises:

identifying one or more matches between words in the linguistic pattern and words in a text string corresponding to the input.

47. The computer readable storage medium of claim 36, wherein the identified respective template includes a word not included in any other template of the plurality of templates.

48. The computer readable storage medium of claim 47, wherein the identified respective template further includes one or more synonyms for the word.

49. The computer readable storage medium of claim 36, wherein the first request includes a third party domain.

50. The computer readable storage medium of claim 36, wherein the user input is received while displaying an application corresponding to the third party service provider.

51. The computer readable storage medium of claim 36, wherein the one or more programs further comprise instructions, which when executed by the one or more processors, cause the electronic device to:

determine whether the user input corresponds to a predefined template and the respective template;

in accordance with a determination that the user input corresponds to the predefined template and the respective template, send a third request to perform at least a portion of the task to a default service provider associated with the predefined template.

52. The computer readable storage medium of claim 36, wherein the third party service provider is selected from a plurality of third party service providers based on a preference of the user.

* * * * *